United States Patent
Horrillo Güemes et al.

(10) Patent No.: US 12,442,784 B2
(45) Date of Patent: Oct. 14, 2025

(54) CHEMIRESISTIVE SENSOR FOR DETECTING $NO_2$

(71) Applicants: CONSEJO SUPERIOR DE INVESTIGACIONES CIENTIFICAS, Madrid (ES); UNIVERSIDAD COMPLUTENSE DE MADRID, Madrid (ES)

(72) Inventors: Maria Carmen Horrillo Güemes, Madrid (ES); Daniel Matatagui Cruz, Madrid (ES); Maria Pilar Marin Palacios, Las Rozas de Madrid (ES); Elena Navarro Palma, Madrid (ES); Jesús López Sánchez, Las Rozas de Madrid (ES); Álvaro Peña Moreno, Las Rozas de Madrid (ES)

(73) Assignees: CONSEJO SUPERIOR DE INVESTIGACIONES CIENTIFICAS, Madrid (ES); UNIVERSIDAD COMPLUTENSE DE MADRID, Madrid (ES)

( * ) Notice: Subject to any disclaimer, the term of this patent is extended or adjusted under 35 U.S.C. 154(b) by 470 days.

(21) Appl. No.: 18/015,474

(22) PCT Filed: Jul. 9, 2021

(86) PCT No.: PCT/ES2021/070499
§ 371 (c)(1),
(2) Date: Jun. 26, 2023

(87) PCT Pub. No.: WO2022/008782
PCT Pub. Date: Jan. 13, 2022

(65) Prior Publication Data
US 2024/0035996 A1    Feb. 1, 2024

(30) Foreign Application Priority Data
Jul. 10, 2020  (ES) .............................. ES202030712

(51) Int. Cl.
*G01N 27/12* (2006.01)
*G01N 33/00* (2006.01)

(52) U.S. Cl.
CPC ....... *G01N 27/125* (2013.01); *G01N 33/0027* (2013.01)

(58) Field of Classification Search
CPC .... G01N 27/04; G01N 27/125; G01N 27/127; G01N 33/0027
See application file for complete search history.

(56) References Cited

U.S. PATENT DOCUMENTS

| 9,869,651 | B2 * | 1/2018 | Akinwande | ........ | G01N 33/0054 |
| 2017/0315075 | A1 * | 11/2017 | Akinwande | ........ | G01N 33/0036 |
| 2017/0350835 | A1 * | 12/2017 | Akinwande | ............ | G01N 27/02 |

FOREIGN PATENT DOCUMENTS

| CN | 108828026 A | * | 11/2018 | ............. G01N 27/30 |
| TW | 201719168 A | * | 6/2017 | |

OTHER PUBLICATIONS

Machine translation of CN 108828026 A (Year: 2018).*

(Continued)

*Primary Examiner* — Nathaniel J Kolb
(74) *Attorney, Agent, or Firm* — Hassan Abbas Shakir; Shakir Law PLLC

(57) ABSTRACT

A chemiresistive sensor has a low limit for detecting $NO_2$ at ambient temperature. An active layer of the sensor includes a few-layer graphene material. The response of the sensor is not altered by relative humidity, and the sensor also demonstrates very low interference with ammonia, allowing this interference to be disregarded in the measurements.

18 Claims, 11 Drawing Sheets

(56) References Cited

OTHER PUBLICATIONS

Machine Translation of TW 201719168 (Year: 2017).*
Extended European Search Report in related patent application EP 21837464.3 prepared by the European Patent Office mailed Jun. 25, 2024.
Ma Jun et al "Gas sensor based on defective graphene/pristine graphene hybrid towards high sensitivity detection of NO2", AIP Advances, American Institute of Physics, 2 Huntington Quadrangle, Melville, NY 11747, vol. 9 No. 7, Jul. 10, 2019 retrieved on Jul. 10, 2019.
Kumud Malika Tripathy et al: "Recent advances in engineered graphene and composites for detection of volatile organic compounds (VOCs) and non-invasive disease diagnosis", Carbon, col. 110, Sep. 3, 2016, pp. 97-129.
Yuxin Lu et al: "Biological and chemical sensors based on graphene materials", Chemical Society Reviews, vol. 41, No. 6, Dec. 5, 2011, p. 2283.
Matatagui Daniel et al: "Ultrasensitive NO2 gas sensor with insignificant NH3-interference based on a few-layered mesoporous graphene", Sensors and Actuators B: Chemical, vol. 335, Feb. 14, 2021, p. 129657.

* cited by examiner

CHEMIRESISTIVE SENSOR FOR DETECTING $NO_2$

CROSS-REFERENCE TO RELATED APPLICATIONS

This application is a national stage under 35 U.S.C § 371 of PCT patent application PCT/ES2021/070499 filed on 9 Jul. 2021, which is pending and which is hereby incorporated by reference in its entirety for all purposes. PCT/ES2021/070499 claims priority to Spanish patent application P202030712 filed 10 Jul. 2020, which is hereby incorporated by reference in its entirety for all purposes.

FIELD OF THE INVENTION

The present invention is directed to a resistive chemical sensor with a low detection limit for the presence of $NO_2$ at room temperature. More particularly, the invention is directed to a resistive chemical sensor comprising a material as active layer of the sensor that is of graphene of few atomic layers, and whose response is not modified by the presence of ambient relative humidity and that, in addition, shows very low interference with ammonia, which makes it possible to rule out its interference in the measurements.

BACKGROUND OF THE INVENTION

Nitrogen dioxide ($NO_2$) is a toxic gas and detrimental to health that is primarily formed in power plants due to combustion processes carried out at high temperatures and in all types of combustion engines. This compound is also concentrated in the air of cities as it is derived from carbon monoxide emissions produced by automobiles and domestic heaters when oxidized. In addition, $NO_2$ contributes to the formation of ground-level ozone, of acid rain, and of photochemical smog. From the physiological point of view, breathing high concentrations of $NO_2$ is related to a series of detrimental effects such as spasms, burns, dilation of throat and upper respiratory tract tissues (reduces oxygenation of the body tissues and produces liquid build-up in the lungs [Bylin, G., Lindvall, T., Rehn, T., & Sundin, B. (1985). Effects of short-term exposure to ambient nitrogen dioxide concentrations on human bronchial reactivity and lung function. European Journal of Respiratory Diseases, 66(3), 205-217]. Indirectly, and since it is one of the causes of fine particulate matter PM2.5 (suspended particles of less than 2.5 microns) and it is related to multiple mental diseases (e.g., autism), cardiovascular diseases (e.g., stroke), kidney diseases, and/or cancers. Related to this latter disease, $NO_2$ is the precursor of a particulate matter declared a Group 1 human carcinogen in October 2013. In accordance with European regulation, the Scientific Committee on Occupational Exposure Limits (SCOEL) of the European Commission establishes at 0.5 ppm and 1 ppm the weighted average values of exposure to $NO_2$ over 8 hours and the short-term exposure limits, respectively. Therefore, a great need arises in the design of highly sensitive gas sensors capable of alerting or warning of the presence of $NO_2$ below these limits, reaching the sub-ppm range.

Research in resistive sensors has been carried out intensively for decades and is currently one of the main technologies used for the detection of domestic, commercial, and industrial gases (EP1042666). The main current challenge is to avoid the high probability of false positives and negatives that the detection of chemical species entails with these devices due to their low selectivity, since a resistive sensor has a response for practically all the gases with which it interacts, also accounting for those that are not of interest (called interfering gases, since they produce a change in the signal of the device that makes its interpretation difficult). Consequently, a great deal of research is focused on the search for sensors with higher selectivity following various strategies such as doping the base material with metallic elements (CN106770498A), decorating with different materials [Matatagui, D., Sainz-Vidal, A., Grácia, I., Figueras, E., Cañé, C., & Sanger, J M (2018a). Chemoresistive gas sensor based on ZIF-8/ZIF-67 nanocrystals. Sensors and Actuators, B: Chemical, 274] and/or the evaluation of the maximum sensitivity temperatures for each particular gas [Ponzoni, A., Baratto, C., Cattabiani, N., Falasconi, M., Galstyan, V, Nunez-Carmona, E., . . . Zappa, D. (2017). Metal Oxide Gas Sensors, a Survey of Selectivity Issues Addressed at the SENSOR Lab, Brescia (Italy). Sensors, 17(4), 714], in no instance is total selectivity achieved for a given gas in a mixture of gases.

Within resistive sensors, semiconductor materials based on metal oxides stand out for their different response depending on whether they are p-type (electrical conduction preferably by holes) or n-type (electrical conduction preferably by electrons), allowing the classification of the gases to be detected in two large groups: oxidants and reducers. For example, if you have a p-type material and it is exposed to an oxidizing gas to which it is sensitive, its electrical resistance decreases as a greater number of holes are generated. On the other hand, if it is a reducing gas, its electrical resistance increases as the number of holes decreases [Matatagui, D., Sainz-Vidal, A., Gracia, I., Figueras, E., Cañé, C., & Sanger, J. M. (2018a). Chemoresistive gas sensor based on ZIF-8/ZIF-67 nanocrystals. Sensors and Actuators, B: Chemical, 274]. If you have an n-type material, opposite responses to those described above occur [Maeng, S., Kim, S.-W., Lee, D.-H., Moon, S.-E., Kim, K.-C., & Maiti, A. (2013). $SnO_2$ Nanoslab as $NO_2$ Sensor: Identification of the $NO_2$ Sensing Mechanism on a $SnO_2$ Surface]. A priori, these selective responses could be an advantage, since a semiconductor device could perfectly distinguish between oxidizing and reducing gases, however, exposure to an environment with mixtures of oxidizing and reducing gases could provide an erroneous sensor response, obtaining, mainly, false negatives because the signals can be counteracted. This result would become the worst-case scenario because a subject could be exposed to a high concentration of two gases that are harmful to health and the sensor would not give any alarm. Another important interference in the sensor's response that could compromise its correct operation is that produced by environmental humidity. This factor is crucial since virtually any real technological application involves measuring with a baseline environmental humidity and, on many occasions, it causes the device to lose sensitivity to the gas of interest [Wozniak, L, Kalinowski, P., Jasinski, G., & Jasinski, P. (2018). FFT analysis of temperature modulated semiconductor gas sensor response for the prediction of ammonia concentration under humidity interference. Microelectronics Reliability, 84, 163-169]

Widely used metal oxide semiconductors (for example, $SnO_2$ [Zhong, Y, Li, W., Zhao, X., Jiang, X., Lin, S., Zhen, Z., . . . Zhu, H (2019). High-Response Room-Temperature $NO_2$ Sensor and Ultrafast Sensor Based on $SnO_2$ with Rich Oxygen Vacancy [Research-article]. ACS Applied Materials and Interfaces, 11 (14), 13441-13449]) as mentioned before, possess a low concentration of charge carriers at room temperature and, therefore, these materials require operating at high temperatures, through external heating, which causes an increased risk of ignition and an increase in energy expenditure. As a possible solution to these problems, the use of carbon-based nanomaterials is currently being investigated since they can operate at room temperature with a high mobility of charge carriers. However, among these nanomaterials, pristine graphene is a relatively chemically inert material, as it does not interact with the chemical elements found in its surrounding environment; graphene oxide has an insulating character, with a low density of charge carriers, an adverse factor for obtaining a sensor device that works based on a change in resistivity/conductivity; and reduced graphene oxide which, although it has part of the functional groups of graphene oxide (epoxide, carboxyl, and/or hydroxyl groups), has semiconductor electrical properties, which has allowed the development of resistive sensors with high efficiency in the detection of $NO_2$ [CN104181209A], these functional groups also display a strong interaction with some interferents such as ammonia and humidity, hindering their use in real environments due to the difficulty of adequately interpreting the sensor response.

Therefore, there is currently the problem of an $NO_2$ sensor that combines in a single device reproducibility, absence of false positives and negatives, high chemical stability, reduced dimensions, the possibility of integrating it into different technologies such as silicon, printed circuits and flexible circuits and high selectivity, that is, low interference with other compounds such as ammonia ($NH_3$) and the presence of humidity ($H_2O$ in the form of vapor in different percentages), in a working range at room temperature of between 10° C. and 30° C.

DESCRIPTION OF THE INVENTION

In a first aspect, the present invention relates to a resistive chemical sensor for the detection of $NO_2$, characterized in that it comprises
an insulating substrate;
at least two metallic electrodes on the insulating substrate;
at least one active layer located on the substrate and the electrodes, connecting said metallic electrodes, where the active layer has a thickness between 20 nm and 100 µm and is made up of particles with a size between 20 nm and 1000 nm agglomerated and nanostructured in nanodomains, where said nanodomains are of non-oxidized graphene with few atomic layers, where said graphene contains structural defects, and where said defects are carbon vacancies in the structure of the graphene with few atomic layers.

In the present invention "graphene with few atomic layers" is understood as having an ordered stacking of 3 to 10 layers of graphene [ISO/TS 80004-13:2017(E)]; it is a nanostructured material that has not been subjected to chemical oxidation and reduction treatments, and that has a high number of structural defects generated during its production, where said defects serve as active sites of chemical reaction to achieve high sensitivity and high selectivity at room temperature, and whose performance is not devalued with environmental humidity. Therefore, they present a high density of charge carriers. These structural defects are caused by the high-energy mechanical grinding process used on the precursor material. In the present invention, for obtaining said material of the active active layer in the sensor of the present invention is characterized in that it comprises the following stages:

(a) grinding graphite flakes by means of a high-energy oscillatory dry mechanical method, for a time of at least 80 min at a grinding speed between 1300 and 1700 rpm, and at a temperature between 15° C. and 35° C.;
(b) dispersing the powder obtained in step (a) in an organic solvent selected from 1-methyl-2-pyrrolidinone, dimethylformamide or dimethylsulfoxide, and wherein the concentration range varies between 0.1 mg/mL and 10 mg/mL; and
(c) drip depositing the solution obtained in step (b) on an integrating circuit comprising an insulating substrate with at least two metallic electrodes on said substrate and evaporating the solvent in the air;
optionally, during step (c) of drip depositing, the resistance between the electrodes is measured.

The measurement of the resistance in step (c) allows, on the one hand, to determine when the solvent of a colloidal drop has evaporated (stabilized resistance value) and, on the other hand, to determine the established threshold resistance, which will depend on the design of the device, that is, the materials used and their sizes and thicknesses, the material of the electrodes, and the active layer. The deposition process is repeated until a stable and low-noise resistance/conductance signal is obtained, ensuring electrical contact between the electrodes through the layer.

The material that comprises graphene with few atomic layers, shows an electrical behaviour characteristic of a p-type semiconductor wherein the number of holes is increased by the high charge transfer that occurs when interacting with an oxidizing gas, such as $NO_2$. This gas mainly interacts with the defects of the nanostructures, which give the sensor device high sensitivity. The low number of functional groups (free radicals), provide the optimized nanostructures with a very low interaction with $NH_3$ molecules (reducing in nature). Likewise, due to this low number of reacting radicals and the hydrophobicity of carbon-based compounds, the relative humidity of the environment practically does not modify the signal of the designed sensor, ensuring its operation in the typically humid environments. Lastly, despite the excellent response of the sensor to $NO_2$, it is possible to improve the speed of adsorption and desorption of the $NO_2$ molecules by means of a photoactivation process in the ultraviolet range, because the material of the active layer absorbs in the range of that radiation, causing their activation with light in a faster manner for adsorption and fundamentally for desorption, where the process is more stable and stronger.

Therefore, the material that forms the active layer of the present invention has not been subjected to any chemical attack to obtain oxygenated functional groups to improve interaction with environmental compounds.

Accordingly, all the advantages of such a sensor are:
its low detection limit of $NO_2$, with a presence of 25 ppb at room temperature, where the sensor would already begin to detect said gas and whose response is not drastically modified by the presence of ambient relative humidity;
very low interference with ammonia (reducing agent with a great impact on health and the environment);
improvement of the response, i.e., it becomes more sensitive to the presence of the gas and the speed of said response, by exposure to UV radiation;
easy low-cost industrial upscaling.

In a preferred embodiment of the sensor of the present invention, the insulating substrate is formed of a material selected from FR4, silicon, alumina, polymers, plastics, paper, gallium arsenide, aluminium nitride and glass. In a more preferred embodiment, the insulating substrate is FR4. The advantage associated to FR4 is due to its ease of manufacture and being one of the most used in electronic developments.

In another preferred embodiment of the sensor of the present invention, the electrodes are at least two and the conductive material that forms them is selected from among copper, gold, platinum, aluminium, chromium, titanium, silver and any alloy thereof or copper coated with a material selected from among gold, platinum chrome, titanium any combination of the foregoing. In a more preferred embodiment, the electrodes are two and the conductive material that forms them is copper coated with gold. The advantage associated with copper coated with gold is due to its good adhesion to the substrate.

In another preferred embodiment of the sensor, the electrodes are interdigitated, with a space between the electrodes of between 1 µm and 1000 µm, thus improving the electrical contact with the active material, and thereby the noise being lower and the values of resistance more stable.

In a more preferred embodiment of the sensor of the present invention, the electrodes are 2, they are of copper coated with gold, both electrodes being interdigitated, with a space between the electrodes of between 25 µm and 250 µm, and wherein the confined area between the electrodes is between 0.04 $mm^2$ to 4 $mm^2$.

In another preferred embodiment of the sensor of the present invention, the size of the particles of the active layer is between 50 nm and 450 nm.

In another preferred embodiment of the sensor of the present invention the active layer has an absorbance an absorption spectrum in the ultraviolet-visible region with an absorption maximum located between 200 and 400 nm. In a more preferred embodiment of the sensor, the absorption maximum is located between 250 nm and 270 nm.

In another preferred embodiment of the sensor of the present invention, the active layer presents a Raman spectrum comprising 4 characteristic bands, where said bands are D, G, D' and 2D, wherein the relationship between the amplitudes between the D and G bands has a value comprised between 0.6 and 1.5, and wherein the ratio between the amplitudes of the bands D' and G has a value comprised between 0.1 and 0.4.

In another preferred embodiment of the sensor, it also comprises a flow controller to circulate air towards the active layer.

In another preferred embodiment of the sensor of the present invention, said sensor is located in a chamber. In a more preferred embodiment, said chamber is watertight.

In another embodiment of the sensor of the present invention, it also comprises the appropriate means to close the circuit with the electrodes and the active layer. In another more preferred embodiment of the sensor, it also comprises the appropriate means to measure and/or visualize the resistance thereof.

A second aspect of the present invention is the process for obtaining the resistive $NO_2$ gas sensor described above characterized in that it comprises the following steps (a) grinding graphite flakes by means of a high-energy oscillatory dry mechanical method, for a time of at least 80 min at a grinding speed of between 1300 and 1700 rpm, and at a temperature between 15° C. and 35° C.;

(b) dispersing the powder obtained in step (a) in an organic solvent selected from 1-methyl-2-pyrrolidinone, dimethylformamide or dimethylsulfoxide, and wherein the concentration range varies between 0.1 mg/ml and 10 mg/ml; and (c) drip depositing the solution obtained in step (b) on an integrating circuit comprising an insulating substrate with at least two metallic electrodes on said substrate and evaporating the solvent in the air;

optionally, during the step (c) of drip depositing, the resistance between the electrodes is measured.

In a preferred embodiment of the process, during the mechanical grinding of step (a), pauses in said grinding are made every 15 min and 30 minutes until the thermalization of the material and of the grinding equipment is reached at a temperature between 15° C. and 35° C. In this way, homogeneous samples with a large amount of graphene with few atomic layers are obtained, and thus avoiding undesired increases in temperature inside the container generated by friction during oscillatory dry grinding and thus avoiding problems with the effective exfoliation process for obtaining the active layer of graphene with few atomic layers and/or the generation of undesired secondary phases.

In the present invention, "graphite flakes" are understood as monocrystalline graphite in the form of flakes, and wherein each graphite flake is between 2 µm and 50 µm in length and with a thickness of less than 100 nm.

In a preferred embodiment, the mechanical grinding of stage (a) is carried out in a ball mill in a metal container whose interior is coated with a material selected from among those with a Knoop hardness greater than 1,000 $kg/mm^2$, preferably tungsten carbide, and adding at least one ball of the same material that covers the interior of the metal container, and that meets a mass ratio between the ball or balls and the graphite used of between 1:20 and 1:30, the volume ratio between the ball or balls and the precursor graphite powder is between 0.8:1 and 1.2:1, preferably 1:1, and the volume ratio between the ball or balls and the container receptacle is between 1:48 and 1:52, preferably 1:50. A material of said hardness or higher is used as the lining of the container and as the material of the mill balls to avoid contamination and/or the formation of undesired phases.

In a preferred embodiment of the process, the grinding time of step (a) is between 80 min and 500 min. In another more preferred embodiment, the time is between 80 min and 300 min. In another even more preferred embodiment, the time is between 80 min and 200 min. In an even more preferred embodiment, the time is between 80 min and 120 min.

In another preferred embodiment of the process, the organic solvent is 1-methyl-2-pyrrolidinone.

In another preferred embodiment of the process, when the resistance between the electrodes is measured during step (c) of drip depositing, the resistance measured between each deposited drop is stable, remaining without a change of more than 10% of the resistance for a time of 1 min, before depositing the next drop of the process of step (c). In this way it is confirmed that all the solvent of each deposited drop is evaporating and, on the other hand, the threshold resistance value of the sensor is established once there are no differences between the resistance measurements after each deposited drop.

Another aspect of the invention refers to the use of the sensor described above, to detect the presence of $NO_2$ in a concentration of at least 25 ppb in air at a temperature between 15° C. and 35° C.

In another preferred embodiment of the use, the sensor is exposed to ultraviolet radiation between 200 nm and 400 nm, which would decrease the concentration of the detection limit and the response time between 1% and 4%, but fundamentally the time of recovery.

In another preferred embodiment of the use, if in the air there is any of the elements selected from the following list $NH_3$, relative humidity between 0.5% and 40% and any combination of the above, the presence of $NO_2$ is detected at a concentration of at least 25 ppb in air at a temperature between 15° C. and 35° C.

A final aspect of the present invention is a method of using the sensor of the present invention characterized in that it comprises the following steps a) circulating reference air, without $NO_2$, with a flow of 25 mL/min to 1000 mL/min, established by means of a flow controller, through a chamber where the sensor described according to any of claims 1 to 7 is located, for a time between 10 min and min so that the resistance of the sensor has a stable initial value;

b) exposing the sensor of step (a) to air to detect the presence of $NO_2$ until at least the value of the response of the sensor is three times its noise, for a maximum time of 30 min; and c) purging the air inside the chamber for a time between 10 min and 30 min;

optionally during step (a) and (b) the sensor is exposed to ultraviolet radiation of between 200 nm and 400 nm, more preferably of between 260 nm and 280 nm.

In a preferred embodiment of the method, the chamber of step (a) is watertight and the circulating air flow is between 80 ml·min$^{-1}$ and 120 ml·min$^{-1}$.

In another preferred embodiment of the method, the purging of step (c) is carried out by circulating air, synthetic air, nitrogen, argon, and any combination thereof through the chamber.

In another embodiment of the method, all steps of said method are carried out at a temperature between 15° C. and 35° C.

Throughout the description and claims the word "comprise" and its variants are not intended to exclude other technical characteristics, additives, components or steps. Other objects, advantages and features of the invention will be apparent to those skilled in the art in part from the description and in part from the practice of the invention. The following examples and figures are provided by way of illustration and are not intended to be limiting of the present invention.

EXAMPLES

Next, the invention will be illustrated by some tests carried out by the inventors, which show the effectiveness of the product of the invention.

Example 1

Sensor designed operating at room temperature for 0.5 ppm $NO_2$.

Figure 1:
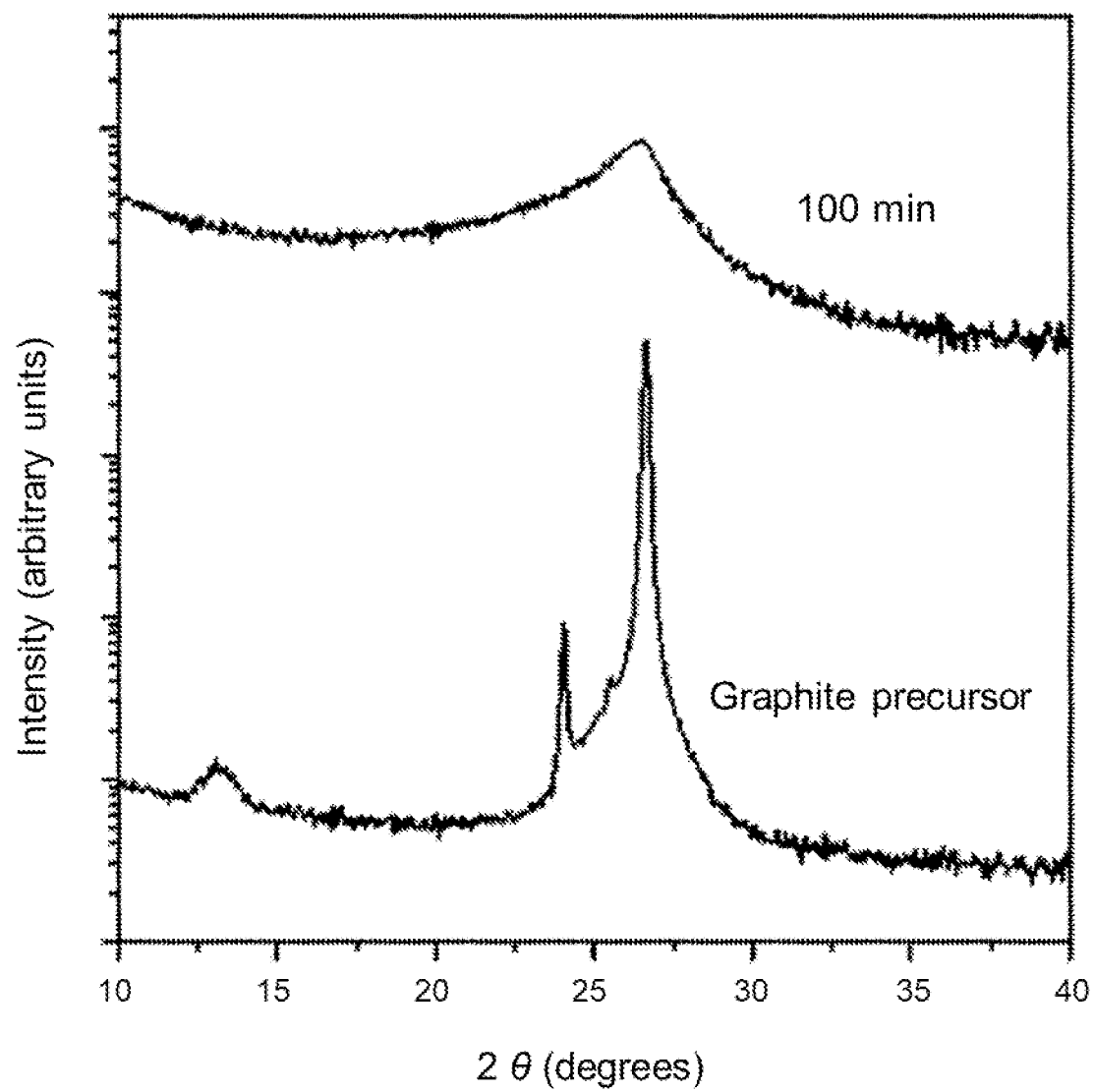
FIG. 1. X-ray diffraction diagram of the material comprising the active layer and comparison with the graphite flake material.
Figure 2:
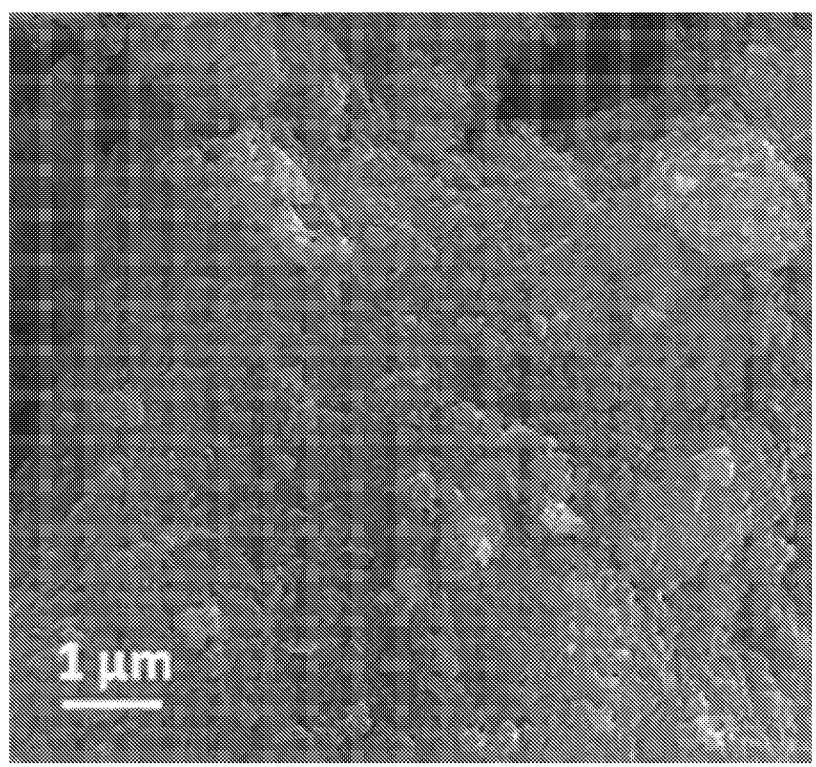
FIG. 2. Scanning electron microscopy (SEM) image of the material comprising the active layer.
Figure 3:
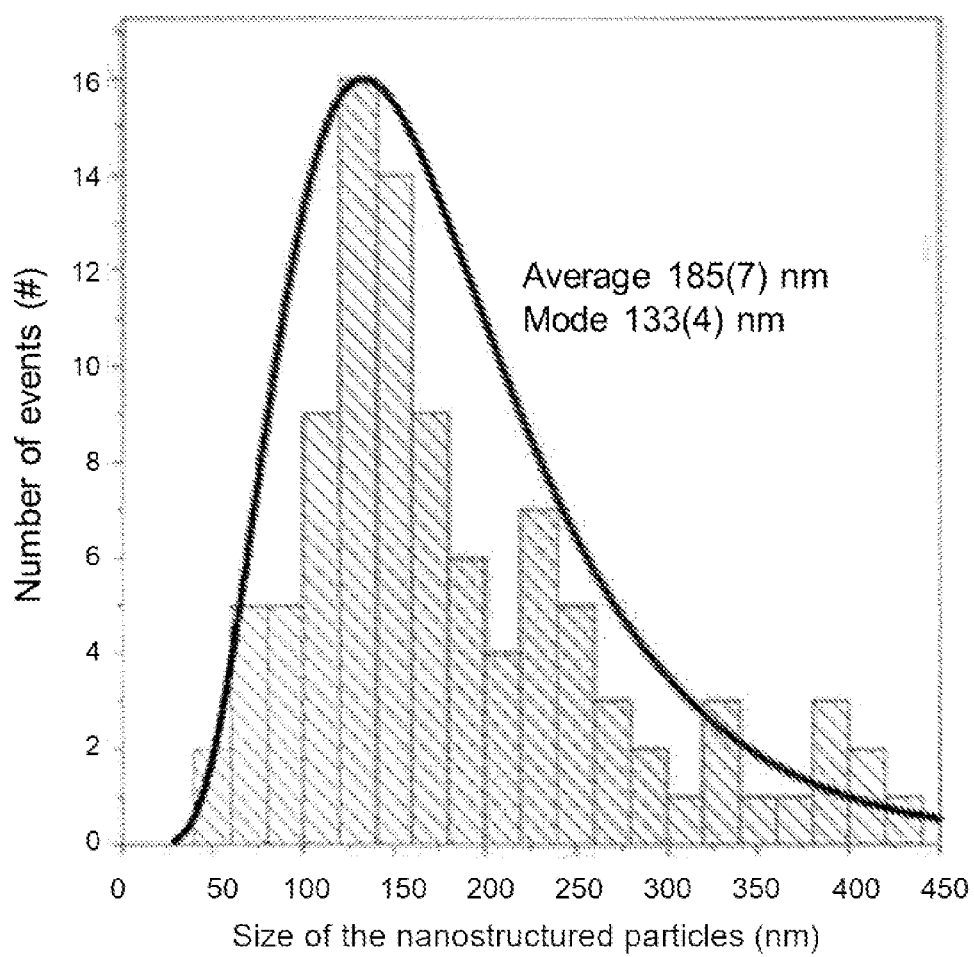
FIG. 3. Particle size distribution of the material comprising the active layer.
Figure 4:
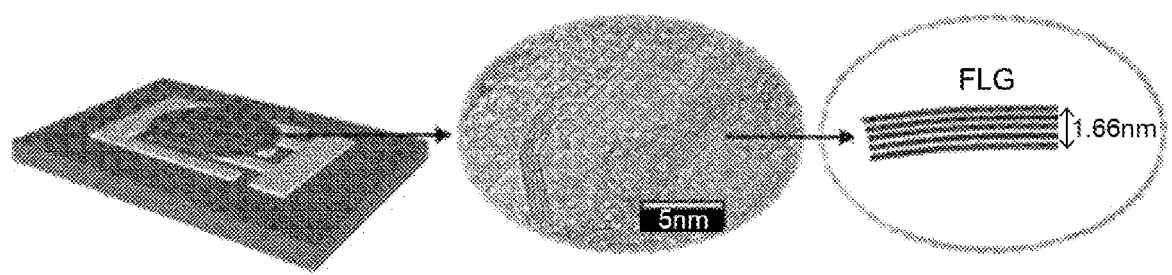
FIG. 4. Morphology of graphene nanostructures with few atomic layers by high-resolution transmission electron microscopy (HRTEM) that make up the active layer.
Figure 5:
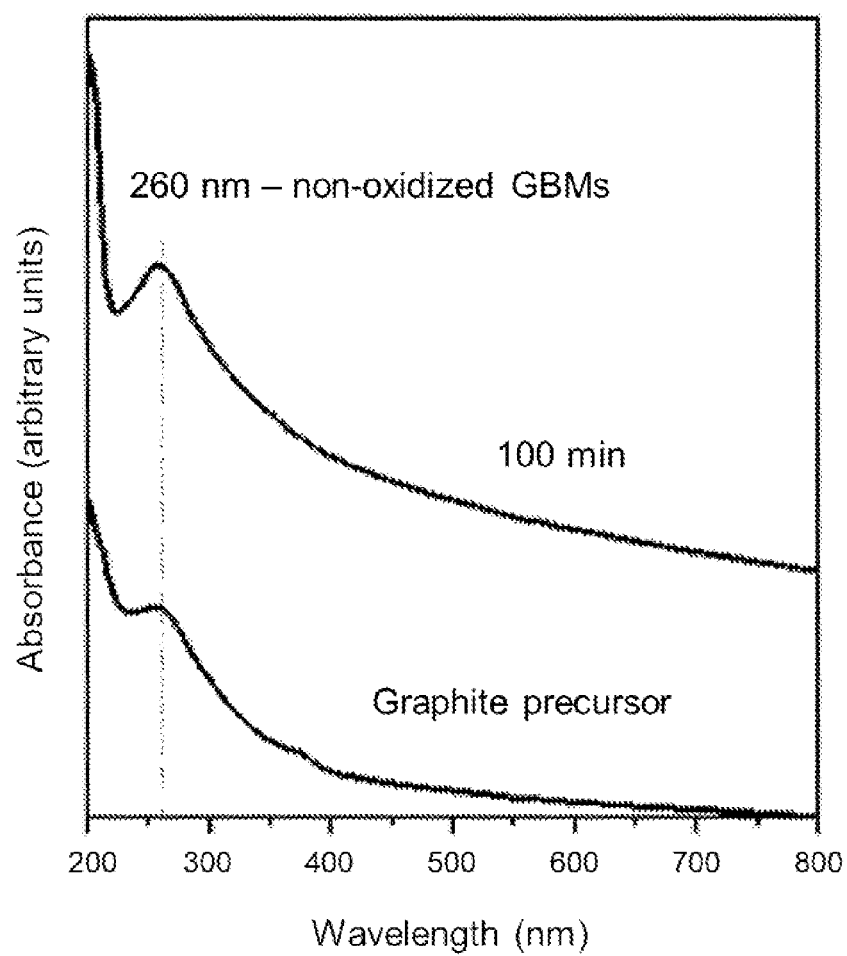
FIG. 5. Electromagnetic absorption spectrum in the visible-ultraviolet range of the material comprising the active layer and comparison with the graphite flake material.
Figure 6:
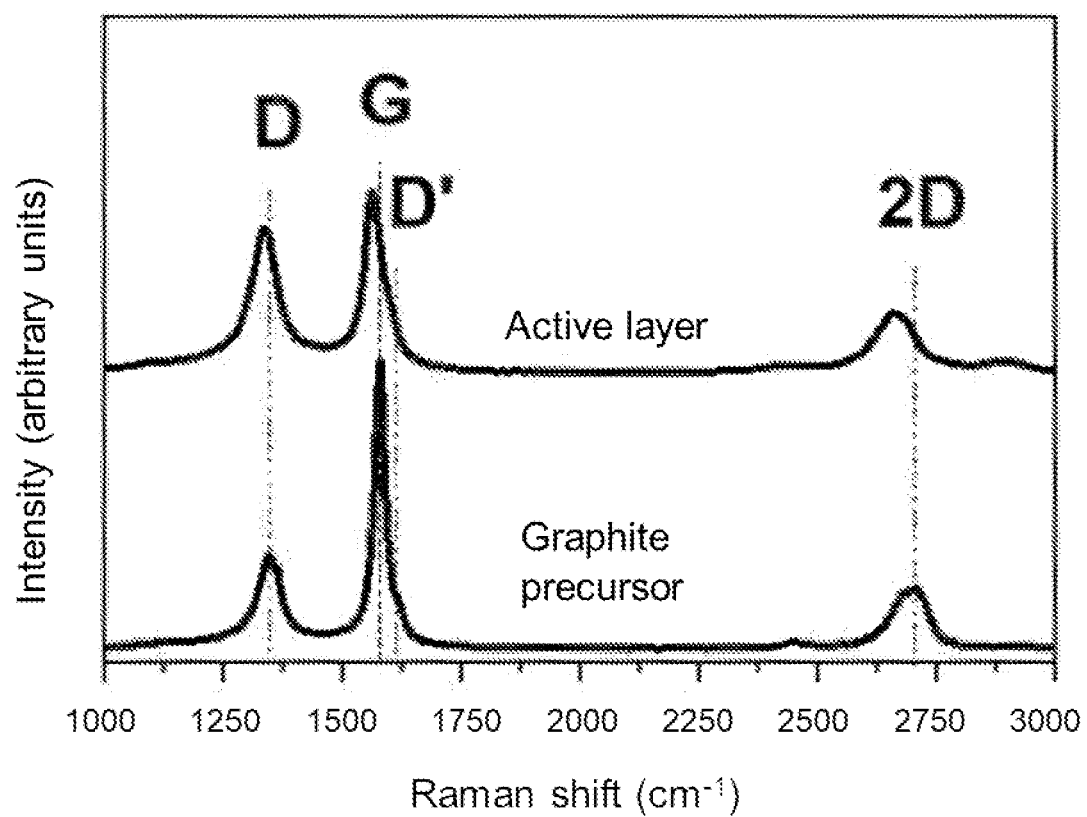
FIG. 6. Confocal Raman spectrum of the material comprising the active layer and comparison with the graphite flake material.

Firstly, with respect to the structural and morphological properties, the material that forms the active layer is obtained by 100 minutes of mechanical grinding at 1500 rpm, and the product obtained has an X-ray diffraction pattern characteristic of graphite confined in the nanoscale due to the large width of the diffraction maxima present (FIG. 1). In addition, the material of the active layer, as verified in the scanning electron microscopy image (FIG. 2), has an average particle size of 185(7) nm and a mode of 133(4) nm, following a log-normal distribution (FIG. 3). These particles are rich in graphene with few atomic layers, as can be seen in the transmission electron microscopy image of the scheme in FIG. 4 (middle image). Finally, considering the optical properties, the electromagnetic spectra of non-oxidized carbon-based compounds have a strong absorption with a maximum around ~260 nm with a spectral width between 220-350 nm (FIG. 5). In relation to the number of defects generated during high-energy grinding, it is observed, in the confocal Raman microscopy spectrum corresponding to the sample of the material that forms the active layer of the sensor after grinding for 100 minutes, where a considerable increase in the bands associated with defects (D and D' in FIG. 6) can be seen.

Figure 7:
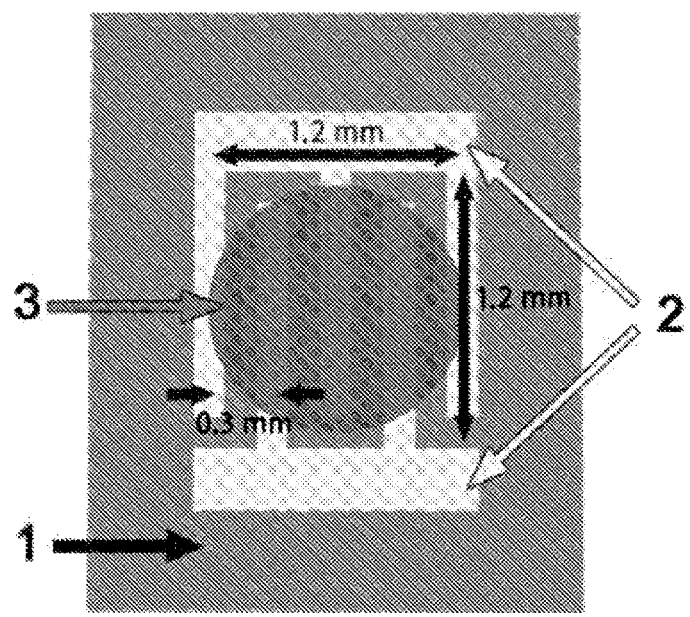
FIG. 7. Diagram of the sensor of example 1. This sensor is made up of an insulating substrate (1), at least two electrodes (2) and an active layer (3).

The sensor device (FIG. 7) is made of an FR4 substrate (1) with a thickness of 0.6 mm in this example, on which the interdigitated electrodes (2) of copper coated with gold are located. The width of each electrode as the space between them is equal to 0.15 mm and the confined area between the electrodes is 1.2 mm×1.2 mm in this example. On the substrate and the electrodes, connecting to said electrodes, the active layer (3) is placed.

Figure 8:
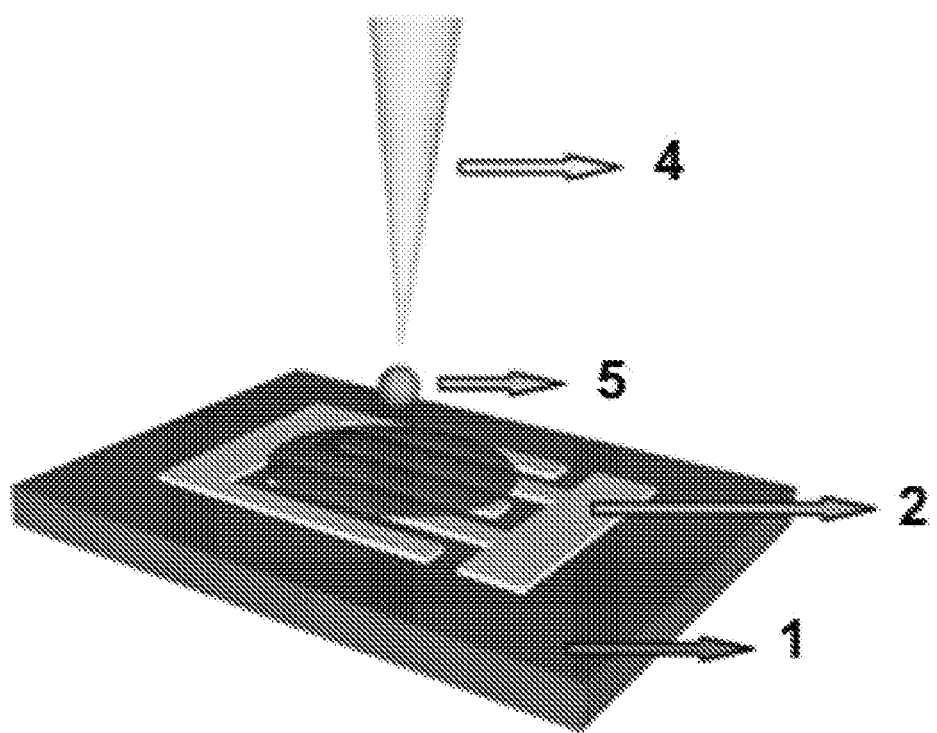
FIG. 8. Micropipette (4) that generates droplets from the dispersion of nanostructured particles (5) in graphene domains with few atomic layers. These drops are deposited on the substrate (1) with the interdigitated electrodes (2) to obtain the sensitive layer of the $NO_2$ sensor.

During the deposition process (FIG. 8) of the particles, drop by drop using a micropipette (4), which generates drops of the dispersion of nanostructured particles (5), the resistance between the electrodes is monitored and allows, on the one hand, to determine when the solvent of a colloidal drop has evaporated (stabilized resistance value) and, on the other hand, to determine the threshold resistance established at 10 kΩ±1 kΩ for this example. This value ensures electrical contact between the sensitive layer and the electrodes, allowing a reduced noise level.

Once the sensitive layer is deposited in the integrating circuit and stabilized with the drying process, the sensor device is located in a watertight chamber, to control the quantities of the gases and their flows exactly. This sealed cell allows to circulate a constant synthetic air flow of 100 To determine the real performance of this example of $NO_2$ sensor, consecutive exposure and purge measurements are performed and the sensitivity, response and recovery times, selectivity against ammonia (subsequent example 2) and the influence of humidity (subsequent example 3) are evaluated. In a first measurement, the sensor is exposed to ~500 ppb of $NO_2$ for 30 min and then purged for a long period of time. This step is performed with and without photoactivation using a ~275 nm LED with a light power of ~11.5 mW.

The sensor response is calculated by the equation:

$$\text{Response} = (R - R_0)/R_0$$

where R is the electrical resistance of the sensor modified by the gas to which it is exposed and $R_0$ is the resistance of the sensor in air.

Figure 9:
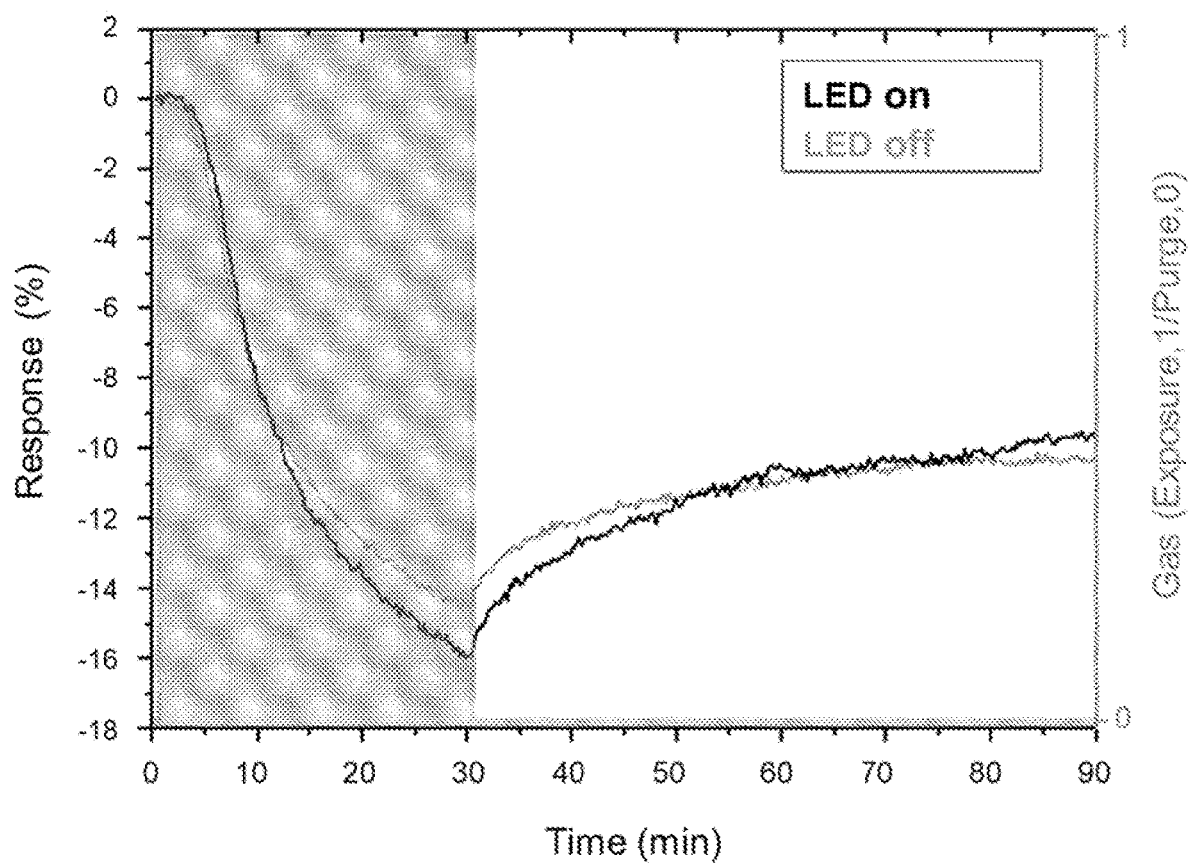
FIG. 9. Real-time response of the sensor at room temperature for 0.5 ppm of $NO_2$ with and without UV radiation of the sensor of example 1.

In FIG. 9 it can be seen how the sensor has a high response (according to the previous formula) to $NO_2$, approximately 14% without ultraviolet radiation. However, this response is improved with the photo-activation process with ultraviolet radiation, reaching a response of approximately 16%. In addition, the photoactivation process allowed to obtain a faster recovery of the initial resistance of the sensor during the purging process compared to the case of absence of ultraviolet radiation.

It was calculated based on 100 measurements that the noise level of the sensor is below ~0.25% (calculated as the largest difference of the resistance values of 100 measurements of the sensor resistance in air). Therefore, if it is assumed that the limit of detection is obtained for a signal that must exceed 3 times the noise level of the sensor (0.25%×3=0.75%), concentrations of up to ~25 ppb of $NO_2$ can be detected. Specifically, the maximum gradient of the evolution of the response in real time of the sensor with photoactivation is also calculated and a value of 1.4% per minute is obtained. This result means that $NO_2$ can be detected relatively quickly in environments with a concentration of ~500 ppb.

Example 2

Sensor operating at room temperature for 50 ppm $NH_3$ with UV radiation.

The sensor used in this example is the same as that used in Example 1. Therefore, the structural and optical characterization, the integration circuit design and the set-up measurement conditions are identical.

Figure 10:
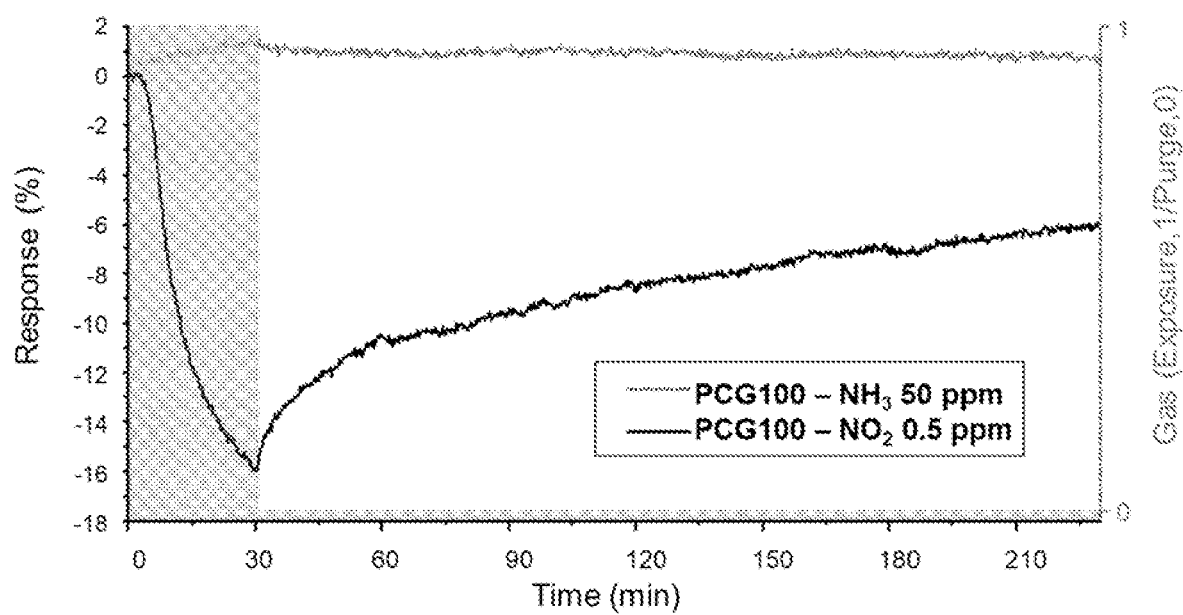
FIG. 10. Real-time response of the sensor at room temperature for 50 ppm $NH_3$ with UV radiation. The one obtained for 0.5 ppm of $NO_2$ with UV radiation from the sensor of example 1 is added for comparison.

Specifically for this experiment, where the selectivity of the designed sensor is evaluated, one of the main advantages is its very low response to $NH_3$. FIG. 10 shows that the sensor response increases by ~1% by introducing 50 ppm. This low sensor response, compared to the ~16% obtained for 0.5 ppm $NO_2$, gives the sensor high selectivity. Otherwise, the presence of $NH_3$ could attenuate or cancel the response to $NO_2$, giving rise to false negatives and, therefore, it would be an interferent that restricts the applicability of the sensor device. This low interaction with $NH_3$ fits into an interaction model in which the nanostructured particles contain few free radicals attached onto their surface with which they can interact (such as epoxide, amino, carboxyl and/or hydroxyl groups).

Example 3

Sensor Operating at Room Temperature for 0.5 ppm of $NO_2$ and Relative Humidity of 0%, 10% and 33%, at Room Temperature and with UV Radiation.

The sensor used in this example is the same as that used in Example 1. Therefore, the structural and optical characterization, the integration circuit design and the set-up measurement conditions are identical.

Figure 11:
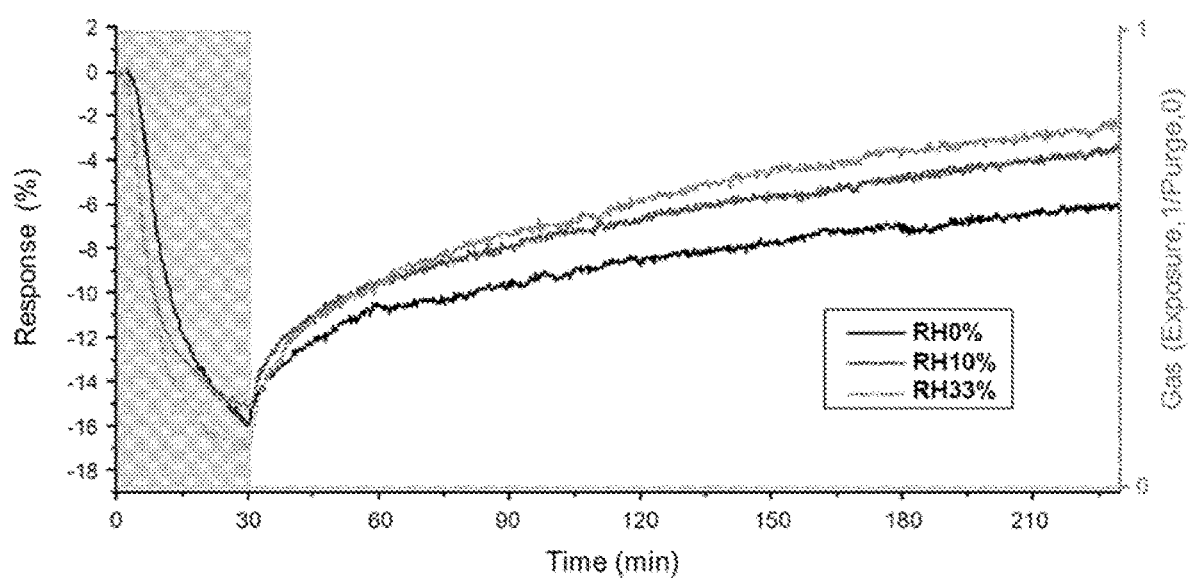
FIG. 11. Real-time response of the sensor at room temperature for 0.5 ppm $NO_2$ and relative humidity of 0%, 10% and 33%, at room temperature (25° C.) and with UV radiation of the sensor of example 1.

The sensor is designed to detect very low concentrations of $NO_2$ even working in scenarios with ambient relative humidity. In this experiment, values of 0%, 10% and 33% are used and a gradual enhanced signal is collected as the relative humidity increases (FIG. 11). Specifically, the highest response is obtained for the case of 33% relative humidity with a value of 17%. In addition, the recovery of the signal tending to the threshold resistance has a higher gradient also as the relative humidity increases. This is due to the fact that, since water molecules react with those of $NO_2$, their desorption is easier. On the other hand, as in the case of $NH_3$, it is shown that the sensor has a low interaction with the water molecules in the environment due, in this case, to a certain hydrophobic character of the carbon-based compounds, because the nanostructured particles have a reduced number of free radicals, mainly hydroxyls, which are key for interaction with these molecules. These results make the sensor designed in the present invention a potential tool to effectively prevent health and environmental problems by operating at room temperature and in both reducing ($NH_3$) and humid environments.

The invention claimed is:

1. A resistive chemical sensor for detection of $NO_2$ comprising:
    an insulating substrate;
    at least two metallic electrodes on the insulating substrate;
    at least one active layer located on the substrate and the electrodes, connecting said metallic electrodes, wherein the active layer has a thickness between 20 nm and 100 μm and is made up of particles of a size between 20 nm and 1000 nm agglomerated and nanostructured in nanodomains, where said nanodomains are of non-oxidized graphene with few atomic layers, wherein said graphene contains structural defects, and wherein said defects are carbon vacancies in the structure of graphene with few atomic layers.

2. The resistive chemical sensor according to claim 1, wherein the insulating substrate is made of a material selected from FR4, silicon, alumina, polymers, plastics, paper, gallium arsenide, aluminium nitride and glass.

3. The resistive chemical sensor according to claim 1, wherein a conductive material that forms the at least two electrodes is selected from among copper, gold, platinum, aluminium, chromium, titanium, silver and any alloy thereof, or copper coated with a material selected from gold, platinum, chrome, titanium and any combination thereof.

4. The resistive chemical sensor according to claim 3, wherein the at least two electrodes are of copper coated with gold and both electrodes are interdigitated, with a space between the electrodes between 25 μm and 250 μm, and wherein the confined area between the electrodes is between 0.04 $mm^2$ of 4 $mm^2$.

5. The resistive chemical sensor according to claim 1, wherein a size of the particles of the active layer is between 50 nm and 450 nm.

6. The resistive chemical sensor according to claim 1, wherein the active layer has an absorbance in the ultraviolet-visible region with an absorption maximum located between 200 and 400 nm.

7. The resistive chemical sensor according to claim 1, wherein the active layer has a Raman spectrum comprising 4 characteristic bands, wherein said bands are D, G, D' and 2D, wherein a ratio between the amplitudes of the bands D and G has a value between 0.6 and 1.5, and wherein a ratio between the amplitudes of the bands D' and G has a value between 0.1 and 0.4.

8. A method of obtaining the resistive chemical sensor for detection of $NO_2$ of claim 1, the method comprising:
   (a) grinding graphite flakes by means of a high-energy oscillatory dry mechanical method, for a time of at least 80 min. at a grinding speed between 1300 and 1700 rpm, and at a temperature between 15° C. and 35° C.;
   (b) dispersing the powder obtained in step (a) in an organic solvent selected from 1-methyl-2-pyrrolidinone, dimethylformamide or dimethylsulfoxide, and wherein the concentration range varies between 0.1 mg/mL and 10 mg/mL; and
   (c) drip depositing the solution obtained in step (b) on an integrating circuit comprising an insulating substrate with at least two metallic electrodes on said substrate and evaporating the solvent in the air.

9. The method according to claim 8, wherein the grinding time of step (a) is between 80 min. and 120 min.

10. The method according to claim 8, wherein the organic solvent is 1-methyl-2-pyrrolidinone.

11. The method according to claim 8, wherein the resistance between the electrodes is measured during step (c) of drip depositing, until the resistance measured between each drop deposited is stable, the resistance remaining without a change greater than 10% for a time of 1 min. before depositing the next drop.

12. The method according to claim 8, further comprising, during the step (c) of drip depositing, measuring a resistance between the at least two metallic electrodes.

13. The method according to claim 8, wherein the active layer has a Raman spectrum comprising 4 characteristic bands, wherein said bands are D, G, D' and 2D, wherein a ratio between the amplitudes of the bands D and G has a value between 0.6 and 1.5, and wherein a ratio between the amplitudes of the bands D' and G has a value between 0.1 and 0.4.

14. Use of a resistive chemical sensor for detection of $NO_2$ comprising:
   an insulating substrate;
   at least two metallic electrodes on the insulating substrate;
   at least one active layer located on the substrate and the electrodes, connecting said metallic electrodes, wherein the active layer has a thickness between 20 nm and 100 μm and is made up of particles of a size between 20 nm and 1000 nm agglomerated and nanostructured in nanodomains, where said nanodomains are of non-oxidized graphene with few atomic layers, wherein said graphene contains structural defects, and wherein said defects are carbon vacancies in the structure of graphene with few atomic layers;
   wherein the resistive chemical sensor is used to detect presence of $NO_2$ in a concentration of at least 25 ppb in air at a temperature between 15° C. and 35° C.
comprising the steps of:
   (a) circulating reference air, without $NO_2$, with a flow of 25 mL/min. to 1000 mL/min., established by means of a flow controller, through a chamber where a resistive chemical sensor is placed for a time between 10 min. and 30 min. so that the resistance of the sensor has a stable initial value,
   (b) exposing the sensor of step (a) to air to detect the presence of $NO_2$ until at least the value of the response of the sensor is three times its noise, for a maximum time of 30 min.; and
   (c) purging the air inside the chamber for a time between 10 min. and 30 min.

15. The use according to claim 14, wherein during step (b) the sensor is exposed to ultraviolet radiation between 200 nm and 400 nm.

16. The method according to claim 15, wherein during step (b) the resistive chemical sensor is exposed to ultraviolet radiation between 250 nm and 270 nm.

17. The use according to claim 14, wherein if in the air there is any of the elements selected from the following list $NH_3$, relative humidity between 0.5% and 40% and any combination thereof, the resistive chemical sensor is used to detect the presence of $NO_2$ in a concentration of at least 25 ppb in air at a temperature between 15° C. and 35° C.

18. The method according to claim 14, wherein the active layer has a Raman spectrum comprising 4 characteristic bands, wherein said bands are D, G, D' and 2D, wherein a ratio between the amplitudes of the bands D and G has a value between 0.6 and 1.5, and wherein a ratio between the amplitudes of the bands D' and G has a value between 0.1 and 0.4.

* * * * *